US006784982B1

(12) United States Patent
Blumenfeld et al.

(10) Patent No.: US 6,784,982 B1
(45) Date of Patent: Aug. 31, 2004

(54) DIRECT MAPPING OF DNA CHIPS TO DETECTOR ARRAYS

(75) Inventors: Martin Blumenfeld, Minneapolis, MN (US); Joseph J. Talghader, Eden Prairie, MN (US); Mark A. Sanders, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 0 days.

(21) Appl. No.: 09/434,027

(22) Filed: Nov. 4, 1999

(51) Int. Cl.$^7$ .................................................. G06K 9/74
(52) U.S. Cl. ........................................................ 356/71
(58) Field of Search ........................ 356/71–73, 36–50, 356/244, 246; 422/50, 68.1

(56) References Cited

U.S. PATENT DOCUMENTS 4,088,561 A * 5/1978 Anderson .................... 204/610
5,293,563 A   3/1994 Ohta (List continued on next page.)

FOREIGN PATENT DOCUMENTS

| DE | 199 14 279 C1 | 9/2000 |
| EP | 0 973 040 A2 | 1/2000 |
| WO | 99/36578 A1 | 7/1999 |
| WO | 00/12123 A2 A3 | 3/2000 |
| WO | WO 00/68670 | 11/2000 |

OTHER PUBLICATIONS

Beattie et al., "Hybridization of DNA Targets to Glass–Tethered Oligonucleotide Probes," *Mol. Biotechnol.*, 4(3):213–225 (1995).
Cohen et al., "Covalent attachment of DNA oligonucleotides to glass," *Nucleic Acids Res.*, 25(4):911–912 (1997).
Hoffman, "Biologically Functionally Materials," *Biomaterials Science*, Ratner et al., eds., Academic Press, London, Title page, publication page, and pp. 124–130 (1996).
Laursen et al., "Solid–Phase Methods in Protein Sequence Analysis," *Methods of Biochemical Analysis, vol. 26*, Glick, ed., John Wiley & Sons, Inc., Title page, publication page and pp. 201–284 (1980).
Millard et al., "Preparation of Glass Plates with Cerium Oxide for DNA Sequencing," *Biotechniques*, 19(4):576 (1995).
Rogers et al., "Immobilization of Oligonucleotides onto a Glass Support via Disulfide Bonds: A Method for Preparation of DNA Microarrays," *Anal. Biochem.*, 266(1):23–30 (1999).
Advertising Supplement, *Science*, 292(5515):317–344 (2001).
IMAGETEAM™ 4710HD/HD10 Fixed Mount 2D Image Reader Product Data Sheet [online]. Hand Held Products, 1999–2001 [retrieved on Nov. 7, 2001]. Retrieved from the Internet: <http://www.handheld.com/HTMLDocs/4710HD-SS_Rev_B.pdf>.

*Primary Examiner*—Tu T. Nguyen
(74) *Attorney, Agent, or Firm*—Fish & Richardson P.C.P.A.

(57) ABSTRACT

A device for detecting the pattern of polynucleic acid hybridization to a surface, the device includes (a) a positioning device for receiving a nucleic acid chip and keeping the chip in a sampling position, the nucleic acid chip being an object with a flat sample surface and an opposed surface that is joined to the sample surface by a thickness, with the sample surface having sequences of nucleic acids immobilized thereto, with each sequence being immobilized to a particular chip address. And, (b) an electronic light detector array, the detector array comprising detector pixels, the detector pixels being sensors located at particular detector pixel addresses, wherein the sampling position places the sample surface of the chip at a well-defined position relative to the electronic light detector array so that light leaving a chip address is substantially directed onto at least one detector pixel with an address that is correlated to the chip address.

86 Claims, 7 Drawing Sheets

U.S. PATENT DOCUMENTS

| | | |
|---|---|---|
| 5,378,883 A | 1/1995 | Batterman et al. |
| 5,459,325 A | 10/1995 | Hueton et al. |
| 5,552,322 A | 9/1996 | Nemoto et al. |
| 5,552,928 A | 9/1996 | Furuhashi et al. |
| 5,556,529 A | 9/1996 | Nemoto |
| 5,556,539 A | 9/1996 | Mita et al. |
| 5,556,752 A | 9/1996 | Lockhart et al. |
| 5,578,832 A | 11/1996 | Trulson et al. |
| 5,593,839 A | 1/1997 | Hubbell et al. |
| 5,599,695 A | 2/1997 | Pease et al. |
| 5,631,734 A | 5/1997 | Stern et al. |
| 5,633,724 A | 5/1997 | King et al. |
| 5,672,881 A | 9/1997 | Striepeke et al. |
| 5,710,000 A | 1/1998 | Sapolsky et al. |
| 5,733,729 A | 3/1998 | Lipshutz et al. |
| 5,744,305 A | 4/1998 | Fodor et al. |
| 5,753,788 A | 5/1998 | Fodor et al. |
| 5,770,456 A | 6/1998 | Holmes |
| 5,770,722 A | 6/1998 | Lockhart et al. |
| 5,831,070 A | 11/1998 | Pease et al. |
| 5,834,758 A | 11/1998 | Trulson et al. |
| 5,837,832 A | 11/1998 | Chee et al. |
| 5,843,655 A | 12/1998 | McGall |
| 5,856,101 A | 1/1999 | Hubbell et al. |
| 5,856,104 A | 1/1999 | Chee et al. |
| 5,856,174 A | 1/1999 | Lipshutz et al. |
| 5,858,659 A | 1/1999 | Sapolsky et al. |
| 5,861,242 A | 1/1999 | Chee et al. |
| 5,871,628 A | 2/1999 | Dabiri et al. |
| 5,874,219 A | 2/1999 | Rava et al. |
| 5,885,837 A | 3/1999 | Winkler et al. |
| 5,889,165 A | 3/1999 | Fodor et al. |
| 5,919,523 A | 7/1999 | Sundberg et al. |
| 5,922,591 A | 7/1999 | Anderson et al. |
| 5,925,525 A | 7/1999 | Fodor et al. |
| 5,928,905 A | 7/1999 | Stemmer et al. |
| 5,945,334 A | 8/1999 | Besemer et al. |
| 5,959,098 A | 9/1999 | Goldberg et al. |
| 5,968,740 A | 10/1999 | Fodor et al. |
| 5,974,164 A | 10/1999 | Chee |
| 6,229,635 B1 | 5/2001 | Wulf |

* cited by examiner

DIRECT MAPPING OF DNA CHIPS TO DETECTOR ARRAYS

BACKGROUND

A DNA chip is a rigid flat surface, typically glass or silicon, with short chains of related nucleic acids spotted in rows and columns on it. Hybridization between a fluorescently-labeled DNA and specific locations on the chip can be detected and analyzed by computer-based instrumentation. The information derived from the results of hybridization to DNA chips is stimulating advances in drug development, gene discovery, gene therapy, gene expression, genetic counseling, and plant biotechnology.

Among the technologies for creating DNA chips are photolithograpy, "on-chip" synthesis, piezoelectric printing, and direct printing. Chip dimensions, the number of sites of DNA deposition (sometimes termed "addresses") per chip, and the width of the DNA spot per "address" are dependent upon the technologies employed for deposition. The most commonly used technologies produce spots with diameters of 50–300 μm. Photolithography produces spots that can have diameters as small as 1 micron. Technologies for making such chips are known to those skilled in these arts and are described, for instance, in U.S. Pat. Nos. 5,925,525, 5,919,523, 5,837,832, and 5,744,305, which are incorporated herein by reference.

Hybridization to DNA chips can be monitored by fluorescence optics, by radioisotope detection, and by mass spectrometry. The most widely-used method for detection of hybridization employs fluorescently-labeled DNA, and a computerized system featuring a confocal fluorescence microscope (or an epifluorescence microscope), a movable microscope stage, and DNA detection software. Technical characteristics of these microscope systems are described in U.S. Pat. Nos., 5,293,563, 5,459,325, and 5,552,928, which are incorporated herein by reference. Further descriptions of imaging fluorescently immobilized biomolecules and analysis of the images are set forth in U.S. Pat. Nos. 5,874,219, 5,871,628, 5,834,758, 5,631,734, 5,578,832, 5,552,322, and 5,556,539 which are incorporated herein by reference.

In brief, these conventional approaches to visualizing the surface of a DNA chip involve placing the chip on a microscope stage, moving the stage to put the sample into focus with a microscope objective, and triggering a digital camera or similar device to capture an image. An objective is a device made of a group of lenses that have a sophisticated design that collects light from the sample, magnifies the image of the sample, and minimizes the unavoidable image and color distortion caused by the passage of the light through the objective. The light-collected from the sample passes through the objective and through a set of mirrors and lenses until is delivered to an eyepiece or the camera. The light path is the path that the light takes from the point where it leaves the surface of the sample until it reaches an imaging device such as an eyepiece or camera. The microscopes are integral with light sources that direct light on to the sample.

These microscopes also have sets of optical filters that allow for viewing of fluorescent images. The DNA that is hybridized to the surface of the DNA chip is typically labeled with fluorescent molecules that absorb light at one wavelength and then emit a different wavelength. The microscope is equipped with sets of optical filters that block the wavelengths of light from the light source but allow the light emitted by the fluorescent molecules to pass through the light path to reach the eyepiece or camera. The light source is typically integral with the microscope and is an important part of the imaging system.

These conventional microscopes are sophisticated and expensive instruments that require training and maintenance. A single microscope objective typically has multiple lenses. A lens, as used herein, means a transparent solid material shaped to magnify, reduce, or redirect light rays. A light filter or mirror is distinct from a lens. Furthermore, use of a microscope requires a dedicated workspace that is approximately the size of a typical desk. Conventional microscopes have a light path that is several centimeters long that transmits the collected light through air and other assorted optical devices within the light path. One of the challenges in microscopy is making the microscope as efficient as possible in capturing all of the light that leaves the sample surface so that an optimal image may be made.

The costly instrumentation conventionally used to image DNA clips impedes the broad usage of DNA chip technologies.

What is needed is an inexpensive, low-maintenance alternative spot detection method for DNA chip analysis that is easy to use and requires a minimum of space and maintenance.

Integrated electronic circuit arrays for light-detection (herein referred to as members of the group of detectors called electronic light detector arrays) and analysis are readily available. They generally are based on CCD (charge-coupled device) or CMOS (complementary metal oxide semiconductor) technologies. Both CCD and CMOS imaging detectors are two-dimensional arrays of electronic light sensors. Each array consists of a set of known, unique positions that are also called addresses. Each address in a CCD or CMOS array is occupied by a sensor that covers an area that is typically shaped as a box or a rectangle; this area or the area occupied by a single sensor is referred to as a pixel. Herein, a light-detecting sensor located on a pixel is called a detector pixel. A detector pixel may be in a CCD sensor, a CMOS sensor, or other device that detects or measures light. The sizes of detector pixels vary widely and may have a diameter or length of 0.2 μm, which is the theoretical limit of resolution of the light microscope. Thus an invention that directly employs electronic detection instead of a conventional optical system is potentially as powerful as any light microscope. Light, as used herein, means any electromagnetic emission of at least 120 nm wavelength and includes ultraviolet, visible, and infrared light.

CCDs, widely used in consumer and scientific applications such as digital recorders and digital cameras, are most sensitive, and may be made with detector pixels that are smaller than those of CMOS devices. CMOS devices are now beginning to be incorporated in recorders and cameras because they are less expensive to produce. CMOS devices also are easier to interface with external control systems than CCDs. Some readily-available CMOS devices are capable of acquiring, digitizing, and transmitting an image without additional circuitry, while CCD arrays require two or more additional circuit elements to accomplish the same tasks.

SUMMARY OF THE INVENTION

The present invention describes an inexpensive device and method for resolving the light spots emitted by a light-transparent DNA chip. The method is direct mapping of the light emitted by a single DNA spot onto corresponding detector pixels of an electronic light detector array system. One method is to put the DNA chip in direct physical contact with the electronic light detector array system. In a modification of this basic method, a simple optical system, such as a single mapping lens, maps an enlarged or reduced version of the DNA array onto the electronic light detector array. Computer software processes the data from the electronic light detector array system. The data may be treated as a two-dimensional map or otherwise processed as an array.

Implementation of the described method would replace the expensive optical detection systems currently employed for DNA chip analysis with an inexpensive system. This system comprises an electronic light detector array, a filter, and, optionally, a mapping lens system. The invention enables the DNA chip to be mapped onto the electronic light detector array. Thus each position on the DNA chip surface has a corresponding position or set of positions on the detector array whereby a fluorescence at an address on the DNA chip surface is projected onto a known pixel or set of pixels.

Direct mapping is inexpensive. It eliminates the need for a complicated microscope that requires maintenance and trained personnel. It captures light directly from the sample; by eliminating many lenses, disadvantages stemming from use of many lenses are reduced. Direct mapping enables direct capture of light so that a maximal amount of light is captured from the sample; minimizing the loss of light creates a very sensitive imaging system.

Electronic light detector array systems include an electronic light detector array such as a CMOS or CCD chip and the associated equipment for visualization. This associated equipment includes filters, lenses, and light sources. The filters may be any filter used to reflect or selectively pass or reject light wavelengths. Such filters include edge filters, narrow band filters, dichroic mirrors and filters used in the visualization arts, including optical, ultraviolet, confocal, and two- or multi-photon microscopy. Light sources include those commonly used in the visualization arts, including optical, ultraviolet, confocal, and two-photon or multi-photon microscopy. Light sources further include light lamps and light lasers, such as visible-light lamps, ultraviolet lamps, mercury lamps, and lasers, including argon lasers, helium-cadmium lasers, semiconductor lasers, and so forth.

Various associated equipment is found in association with these devices, and are known to those skilled in these arts. Such equipment includes manual or electric filter-switchers, movable mirrors, and motors and controls to raster a laser across a sample. Various equipment is associated with CCD and CMOS sensors, which are incorporated into a myriad of commercially available cameras and detectors. For instance, various equipment and techniques are known for producing a color image using red, green, and blue detection; for example, an image may be split into three images, each of which is sent through a red, green, or blue filter to a CCD sensor. Or CCD sensors may be placed on a chip with different sensitivities to red, green, and blue light. Such equipment include techniques and electronic means for improving an image, and include electronic filters (high-pass, low-pass. etc.), time and frame-averaging, image subtraction, and other techniques known to those skilled in these arts.

The detection system may be configured to excite, detect, filter, and process fluorescence from conventional fluorophores, for example, fluorophores described in catalogues published by Life Technologies, Inc. (Rockville, Md.), Sigma-Aldrich, Inc. (SIGMA, ALDRICH, and FLUKA brand names; St. Louis, Mo.), Pierce Chemicals (Rockford, Ill.), and other suppliers known to those skilled in these arts. Similarly, other DNA visualization techniques are currently known and used, and many examples of these technologies are set forth in these same sources. For instance, calorimetric systems that create a color in the visible light wavelength, for instance those based on a stain or on enzyme activity, may be adapted to visualize DNA. And amplification systems that may be used in combination with a colorimetric or fluorescent system may also be used; for example, avidin-biotin or antibody-based techniques. For example, the target DNA labeled with biotin may be placed on the DNA chip. After a washing protocol is performed, the sample may be exposed to labeled avidin, which makes a strong bond to the biotin. The label on the avidin may be a fluorophore (or an enzyme such as horseradish peroxidase (HRP) that is suitable for calorimetric assay). Additionally, DNA may be labeled by chemiluminescence or chemifluorescence and subsequently detected.

DNA may be attached to substrates that pass light by a variety of means known to those skilled in these arts. For instance, glass or quartz may be treated with silanes to create carboxyl or amine groups that may be used in further chemical reactions for immobilizing DNA. Such techniques and many others known to those skilled in these arts are included in the patents incorporated by reference, above, as well as in the following references, which are incorporated herein by reference: Laursen et al., "Solid Phase Methods in Protein Sequence Analysis," in Methods of Biochemical Analysis, vol 26 John Wiley & Sons, Inc. 1980, pp. 202–215; "Immobilization of oligonucleotides onto a glass support via disulfide bonds: A method for preparation of DNA microarrays", Rogers Y H, Jiang-Baucom P, Huang Z J, Bogdanov V, Anderson S, Boyce-Jacino M T, Anal Biochem 1999 January 1;266(1):23–30; "Covalent attachment of DNA oligonucleotides to glass", Cohen G, Deutsch J, Fineberg J, Levine A, Nucleic Acids Res 1997 February 15;25(4):911–2; "Hybridization of DNA targets to glass-tethered oligonucleotide probes", Beattie W G, Meng L, Turner S L, Varma R S, Dao D D, Beattie K L, Mol Biotechnol 1995 December ;4(3):213–25; "Preparation of glass plates with cerium oxide for DNA sequencing", Millard D, de Couet H G, Biotechniques 1995 October; 19(4):576; "Biologically Functional Materials", Allan S. Hoffmnan, in Biomaterials Science, B. D. Ratner, A. S. Hoffmnan, F. J. Schoen, and J. E. Lemons, Eds., pp. 124–130.

The invention may be used with DNA or with other combinations of hybridizable molecules, for instance RNA-DNA or DNA-protein interactions. DNA-DNA hybridization has been used as an example but the invention includes all polynucleic acid hybridization techniques, including RNA-RNA hybridization. Polynucleic acid, as used herein, means DNA, RNA, two or more oligonucleotides or oligonucleosides, and all long or short sequences of nucleic acids. "DNA chip" or "polynucleic acid chip" as used herein refers not only to DNA sequences immnobilized on small solid substrates, but also refers to RNA, etc., and generally to a device with biomolecules immobilized to it.

The present invention is a device and method for detecting the pattern of polynucleic acid hybridization to a surface. The device includes (a) a positioning device for receiving a nucleic acid chip and keeping the chip in a sampling position, the nucleic acid chip being an object with a flat sample surface and an opposed surface that is joined to the sample surface by a thickness, with the sample surface having sequences of nucleic acids immobilized thereto, with each sequence being immobilized to a particular chip address. And, (b) an electronic light detector array, the detector array comprising detector pixels, the detector pixels being sensors located at particular detector pixel addresses, wherein the sampling position places the sample surface of the chip at a well-defined position relative to the electronic light detector array so that light leaving a chip address is substantially directed onto at least one detector pixel with an address that is correlated to the chip address.

DETAILED DESCRIPTION OF THE DRAWINGS

Electronic direct mapping is analogous to the established photographic method known as contact printing. In contact printing, a photographic negative is placed in direct contact with unexposed photographic paper, and illuminated briefly. When the photographic paper is subsequently developed, its image has a 1:1 correspondence to the negative.

The smallest diameter DNA spot currently attainable on a DNA chip approximates the diameter or length of each detector pixel in a conventional CMOS device, roughly 10 $\mu$m. Therefore, if the DNA array and the CMOS array are in close proximity to each other, the light emitted by each member of a DNA array can be directly mapped to a limited number of detector pixels in the sensor array. This direct mapping method would eliminate the expensive optical systems that are required for DNA chip analysis, and, by lowering the cost, expand the potential applications of DNA chip technology.

Figure 1:
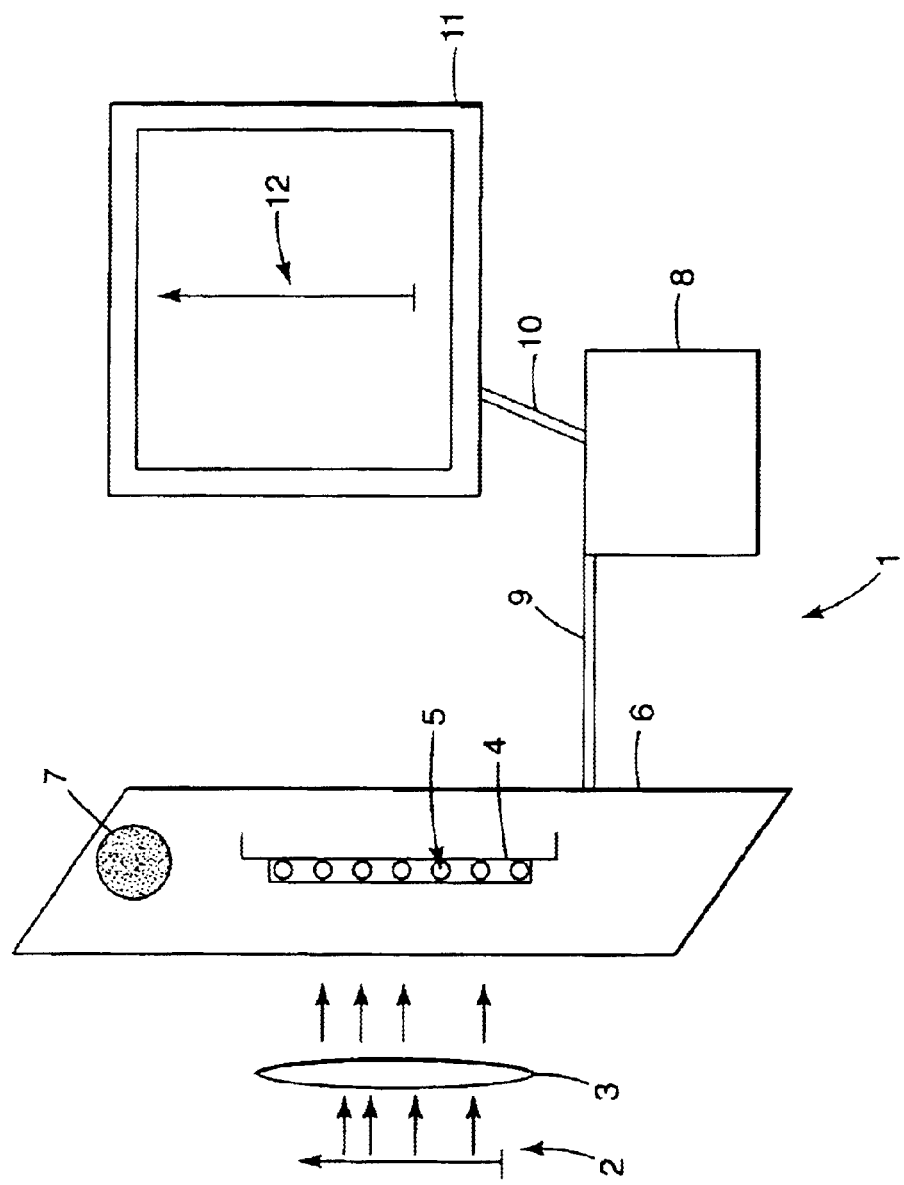
FIG. 1 illustrates the components and general function of an electronic light detector array system.

FIG. 1 illustrates the electronic components and general function of an electronic light detector array detection system such as a CMOS-based detection system 1 which is used to acquire and display a visual image 2. The light image is collected by a mapping lens 3, which focuses the image onto the CMOS detector 4. The detector containing many detector pixels 5, is mounted on a circuit board 6, which contains a direct current power supply 7 for the detector. The detector has electronic circuitry that converts the electrical signals detected by its detector pixels to digital form, and facilitates the transfer of the digitized signal to a computer 8 via a communications cable 9. In the computer, the digital signal is mapped to the computer's video memory, passed by a cable 10 to a monitor 11, which displays the reconstructed image 12.

Figure 2:
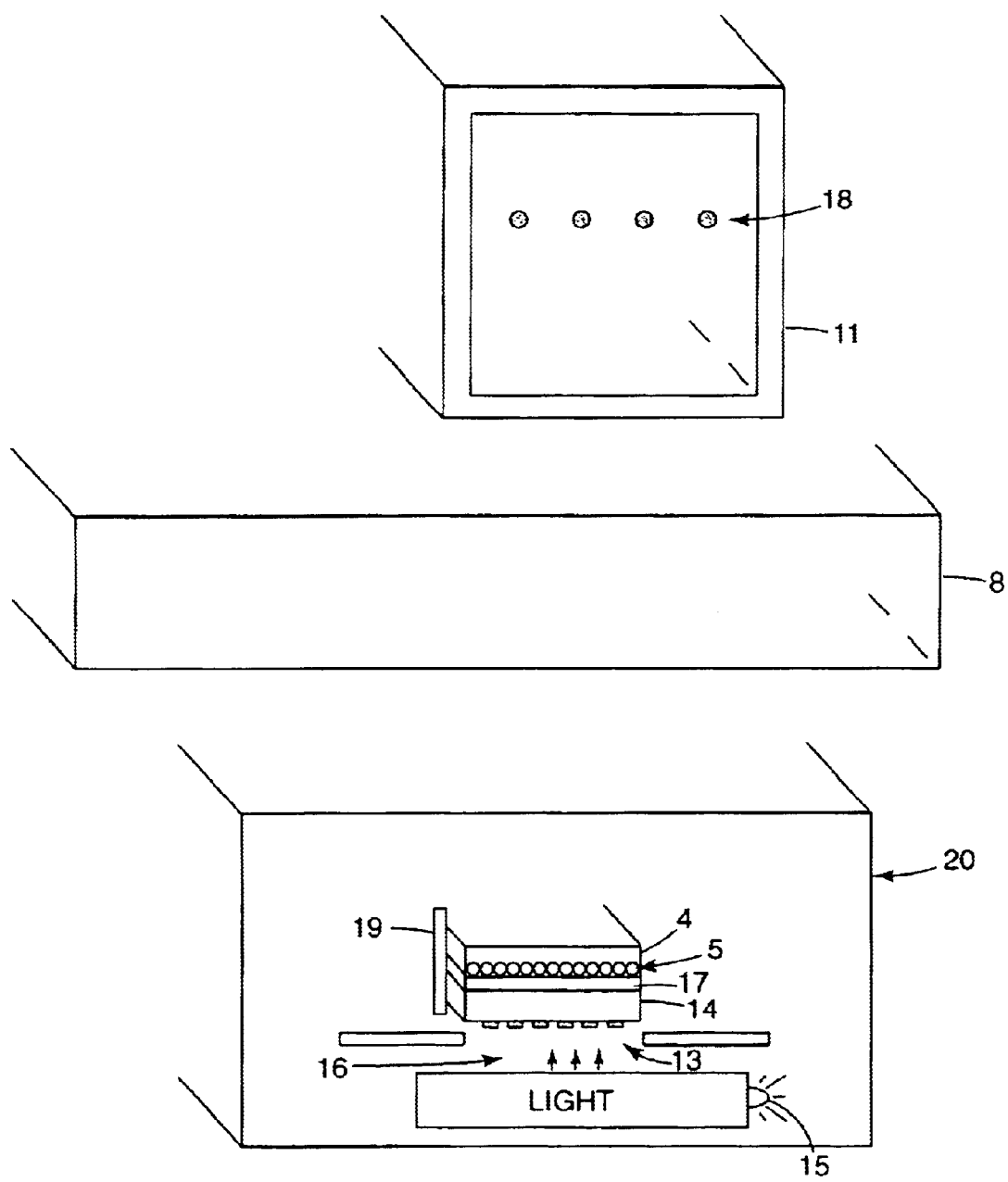
FIG. 2 illustrates the use of direct mapping to acquire and reconstruct the light emitted by a DNA chip.

FIG. 2 illustrates the method used to acquire and display the image 13 emitted by a DNA chip 14 that is excited with ultraviolet or blue light 15 directed through an aperture 16 onto the chip. The emitted light passes through an optical filter 17, that removes the excitation light, and impinges on the detector pixels 5 of the CMOS detector 4. The CMOS detector 4 contains circuitry that converts analog light impulses to digital form, which can be transmitted to a computer 8, and ultimately displayed as a reconstructed image 18 on a monitor 11. A clamping system 19 holds the detector, filter, and DNA chip in contact with each other. A light-tight enclosure 20 houses the optical system. An optical filter, as described herein, means a light filter that blocks the passage of some wavelengths of light and allows the passage of other wavelength of light.

Figure 3A:
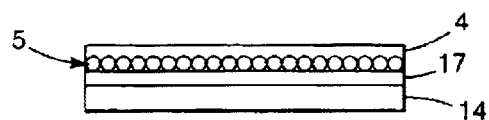
FIGS. 3A, 3B illustrates two alternative arrangements of optical components for direct mapping.
Figure 3B:
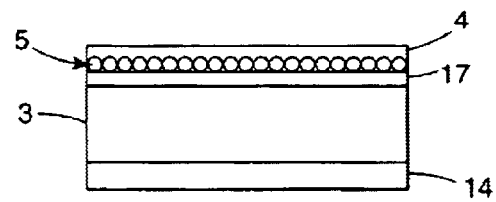

FIG. 3 illustrates two alternative optical detection systems for the direct mapping method. In FIG. 3A, the DNA chip contacts the optical filter. The image on the chip is directly transmitted to the CMOS detector. In FIG. 3B the DNA chip is in sequence with a mapping lens 3, with focal length suitable for focusing the image emitted by the chip onto the surface of the detector.

The theoretical resolving power of this detection method will be directly related to the spacing between the DNA fluorescent sources and the imaging detector pixels. The actual resolving power will also be a function of the emission from the DNA and the sophistication of the software used to extract and reconstruct the DNA fluorescence images. The theoretical resolving power of the configuration including a simple mapping lens or lens system will be limited by the optical quality of the mapping lens and by light diffraction.

However, it is not the goal of this system to have high cost and resolution imaging optics since low cost optics with suitable software will readily map arrays of DNA pixels.

The resolving power of direct mapping can be computed as the sum of the larger of detector pixel diameter (roughly 10 $\mu$m) or spot diameter, plus chip thickness (10 $\mu$m) plus filter thickness (10 $\mu$m). Thus, the image from a 10 $\mu$m DNA spot would map onto a 30 $\mu$m×30 $\mu$m area of the detector containing 9 detector pixels, while the image from a 50 $\mu$m DNA spot would map onto a 70 $\mu$m×70 $\mu$m area countering 49 detector pixels. A CMOS device such as the HDCS-1100 (Hewlett-Packard Components Group; Corvallis, Oreg.) which has a 352×288 detector pixel array, can resolve approximately 1,000 spots that are 10 $\mu$m in diameter, and approximately 2,000 spots that are 50 $\mu$m in diameter.

The detector pixels on suitable electronic light detector array devices can integrate light emission with time, in much the same way that longer photographic exposure is used to develop faint images. This time integration will permit the detection of any light impulse that can be detected with a computer-assisted confocal microscope so long as the fluorescence signal exceeds device dark current and background light. The optical system of the invention (for example, a single mapping lens) can magnify or reduce the image. A mapping lens would permit the emissions from the DNA to optimally project onto the detector pixels of the CMOS device. For instance, a reducing mapping lens is capable of mapping the emission from a 50 $\mu$m spot onto an individual detector pixel.

Figure 4:
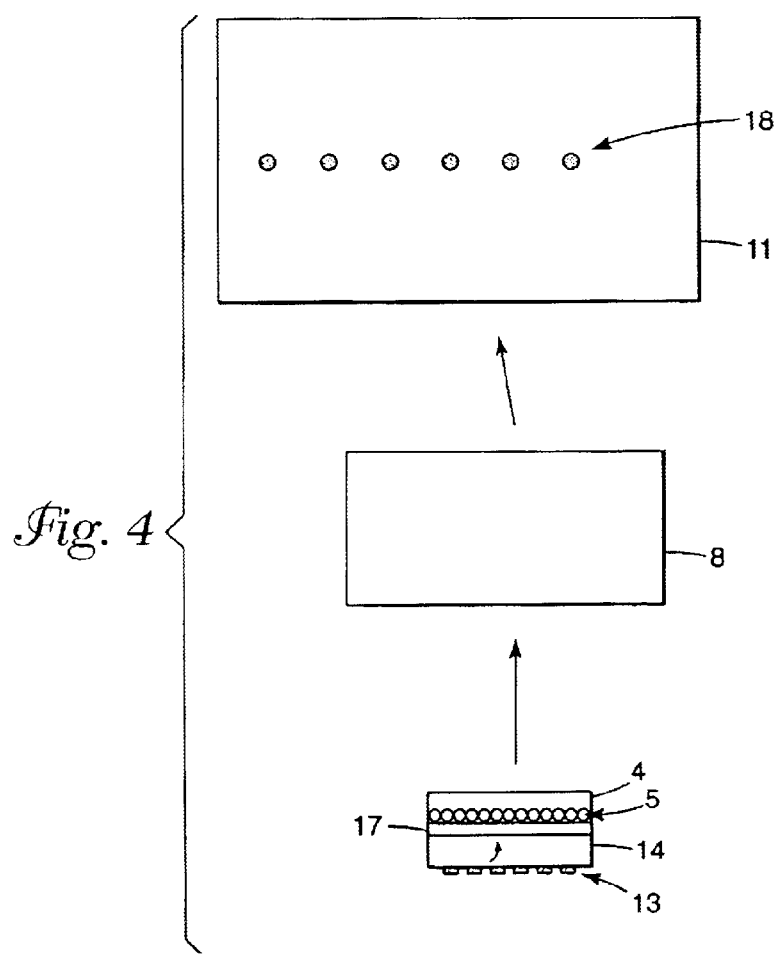
FIG. 4 is a block diagram of an embodiment of the invention.

FIG. 4 is a block diagram of an embodiment of the invention. The light emitted from a DNA chip is passed through an optical filter and transmitted to a CMOS detector, where it is digitized, relayed to a computer, and subsequently displayed as an image on the computer's monitor.

Figure 5:
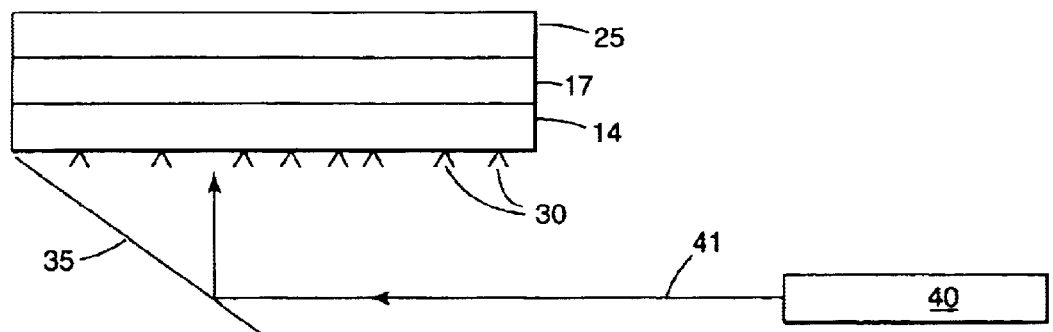
FIG. 5 illustrates an embodiment of the invention with a laser-light source.

The invention is compatible with laser-based visualization techniques (FIG. 5). For instance, a laser 40 may be used to generate laser light 41 that may be reflected off of mirror 35 and thereby directed onto labeled DNA hybridized 30 to DNA immobilized on DNA chip 14. When incorporating a fluorescent label, the hybridized DNA 30 fluoresces and emits fluorescent light. Filter 17 selectively passes the fluorescent light but not the laser light 41. The fluorescent light is directly mapped onto the CCD sensor 25. The laser may be rastered across the sample so that only select portions of the sample are illuminated at one time.

Figure 6:
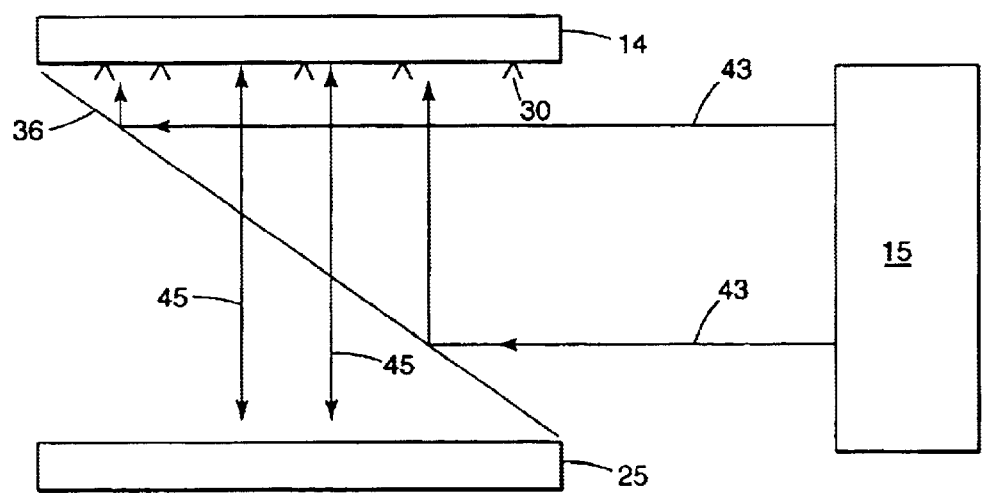
FIG. 6 illustrates an embodiment of the invention with a dichroic mirror.

A laser-based system, or a system using a lamp-type light source 15 may be used with a dichroic mirror arrangement (FIG. 6). The lamp-type source 15 emits light 43 that is reflected off a dichroic mirror 36 onto immobilized, labeled, hybridized DNA 30. If the label on the hybridized DNA 30 is a fluorescent label then the fluorescence emitted in response to excitation by light 43 may pass through dichroic mirror 36 and be mapped directly onto CCD detector 25. An image on a computer screen or in a computer memory may be generated from the detector using techniques already described.

An alternative arrangement (FIG. 6) would be to create a negative image. Numerous means and combinations of making negative images will be immediately apparent to those skilled in these arts after reading this disclosure. A few examples are provided herein but are in no way intended to limit the invention. A negative image could be made by causing DNA to appear as a dark spot on a bright field. For instance a bright fluorescent field created by making DNA chip 14 with autofluorescent components, could be used with a label on hybridized DNA 30 that quenches or blocks light. The hybridized DNA would then appear as dark spots on a computer-generated image. Compounds that quench fluorescence are known to those skilled in these arts. Alternatively, hybridized DNA could be labeled after it is immobilized to the DNA chip 14. For instance, a stain that blocks transmission of visible light may be used. Or the DNA could already incorporate a label that could be calorimetrically developed after the DNA is immobilized; for instance, the hybridized DNA might have an enzyme that would cause a colored precipitate to form when the chip was exposed to a suitable substrate—for example, a horse radish peroxidase (HRP) system could be used. Or the immobilized DNA might have a fluorescent molecule that was quenched by elements on the hybridizing DNA.

Figure 7:
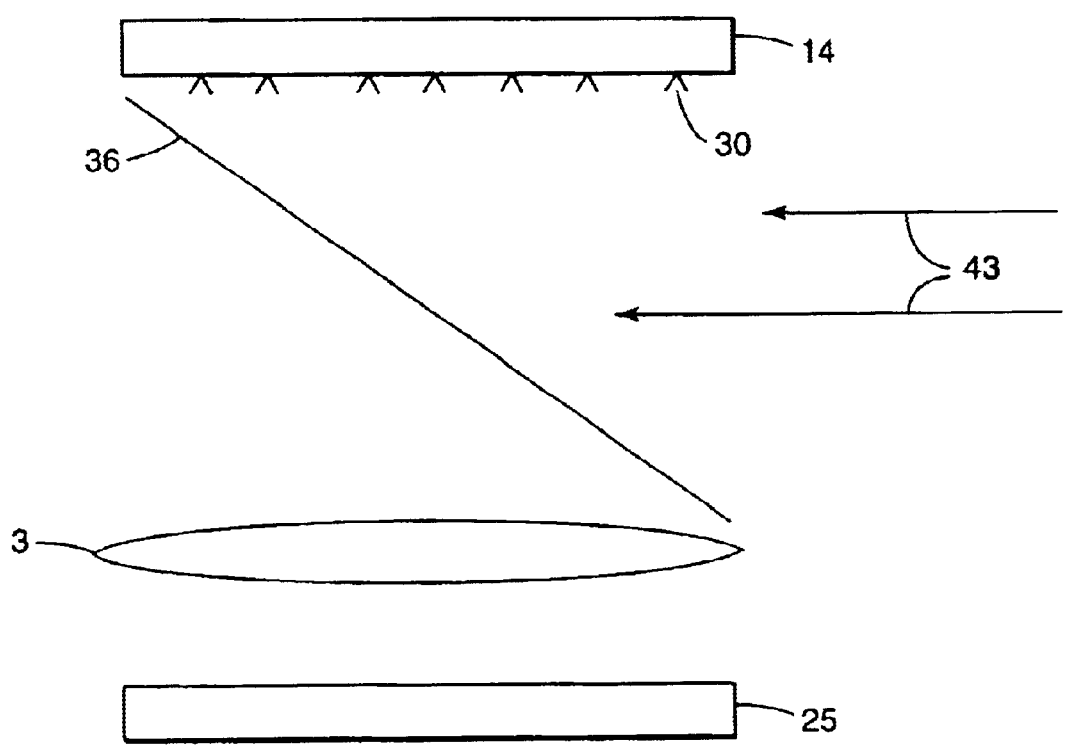
FIG. 7 illustrates an embodiment of the invention with a dichroic mirror and a mapping lens.

A mapping lens 3 may be used to enhance the direct mapping of the system incorporating a dichroic mirror 36 (FIG. 7). Mapping lens 3 will focus light that passes through dichroic mirror 36 so that the pixels of DNA on DNA chip 30 are mapped onto the detector pixels of CCD detector 25.

Figure 8A:
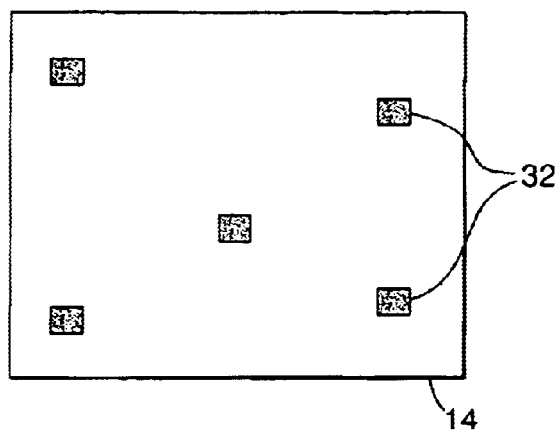
FIG. 8A illustrates a DNA chip with hybridized DNA.
Figure 8B:
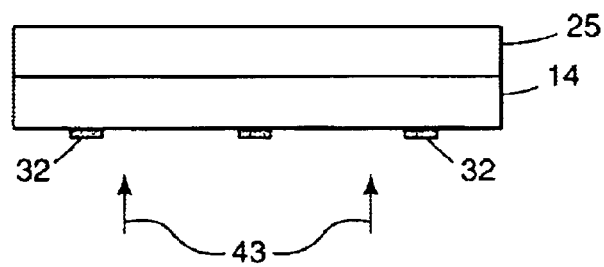
FIG. 8B illustrates an embodiment of the invention with no optical filter.
Figure 8C:
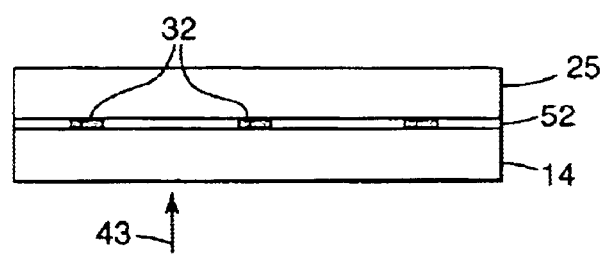
FIG. 8C illustrates an embodiment of the invention with a cover-filter and no optical filter.

The invention may be embodied without an optical filter (FIGS. 8B, 8C). A light-transmitting DNA chip 14 with hybridized DNA may be treated so that the hybridized DNA appears as dark spots that fully or partially block light. Light 43 from a light source passes though DNA chip 14 but is blocked by light-blocking hybridized DNA 32. The resultant map that is formed on CCD detector 25 shows the addresses that have hybridized DNA. Many fluorescent and non-fluorescent techniques for labeling DNA before or after its hybridization to DNA or before or after its immobilization to the DNA chip 14 are known to those skilled in these arts. A variation on this embodiment is to place the face of DNA chip 14 that has the light-blocking DNA 32 on the side opposite the light source. A cover 52 may be interposed between the DNA 32 and the CCD detector 25 so that CCD detector is not fouled by the DNA 32. The cover 52 may be a mere protective film such as a coating, or a coverslip, a plastic wrap such as polyethylene film, or other material that transmits the wavelength of the light 41. Light 43 may be any wavelength specified herein as light and DNA 32 may be any means for blocking that transmission that is known to those skilled in these arts.

Figure 9A:
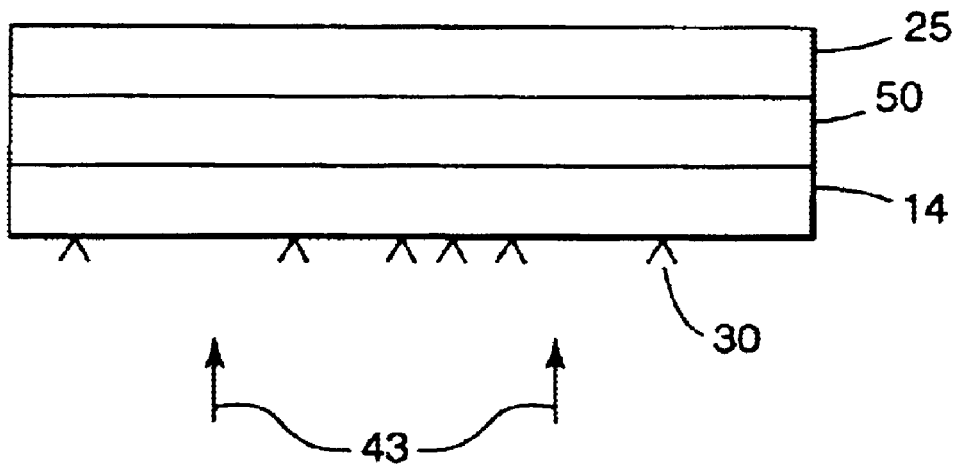
FIG. 9A illustrates an embodiment of the invention with a combination mapping lens-filter.
Figure 9B:
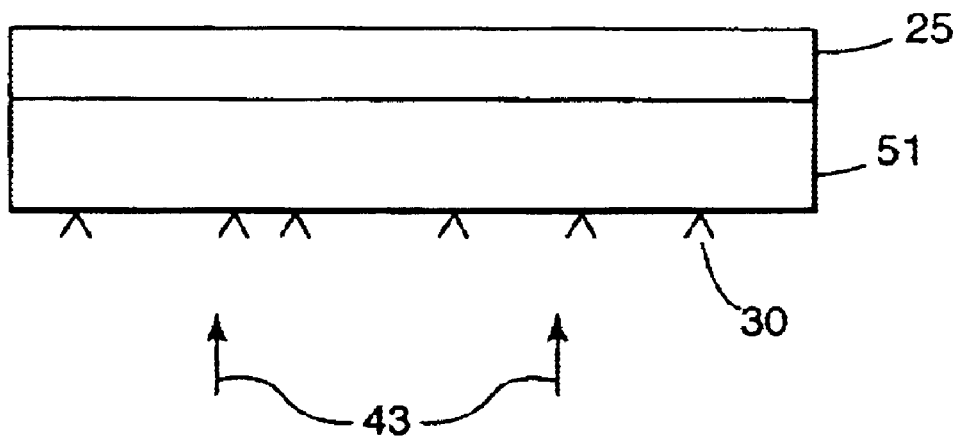
FIG. 9B illustrates an embodiment of the invention with a combination chip-filter.

The filters, lenses, and DNA chips of the invention may be used in various combinations (FIGS. 9A, 9B). For instance a lens and filter may be combined into lens-filter 50 that is interposed between the DNA chip 14 and CCD detector 25. Or the DNA chip may be made as DNA chip-filter 51 that provided a solid substrate for DNA immobilization and acts to filter the light from the light source or from the immobilized DNA 30. Materials or coatings for filters are well-known to those skilled in the optical arts.

Several embodiments of the invention are described herein. These embodiments are illustrative of the invention but are not to be construed as embracing all of its embodiments or as limiting on the scope of the invention.

What is claimed is:

1. A device for detecting the pattern of polynucleic acid hybridization to a surface, the device comprising:
   (a) a nucleic acid chip holder configured to receive a nucleic acid chip and keep the chip in a sampling position;
   the nucleic acid chip being an object with a flat sample surface and an opposed surface that is joined to the sample surface by a thickness, with the sample surface having sequences of nucleic acids immobilized thereto, with each sequence being immobilized to a particular chip address;
   (b) an optical filter that selectively transmits light;
   (c) an electronic light detector array, the detector array comprising detector pixels, the detector pixels being sensors located at particular detector pixel addresses; and
   (d) a light source that generates source light wherein the sampling position is a position that places the sample surface of the chip in a well-defined spatial relationship relative to the electronic light detector array so that the source light that touches a chip address on the sample surface is substantially directed onto at least one detector pixel with an address that is correlated to the chip address.

2. The device of claim 1 wherein the chip address to the detector pixel correlation is one-to-one, whereby the light to aching a single chip address is directed to substantially one detector pixel.

3. The device of claim 1 wherein more than one detector pixel is correlated to one chip address.

4. The device of claim 1 wherein light leaving the sample surface of the chip passes through the chip thickness before reaching the detector pixels.

5. The device of claim 4 wherein the light leaving the sample surface of the chip passes through an optical filter.

6. The device of claim 5 comprising a mapping lens that changes the direction of light rays leaving the sample surface of the chip, wherein the mapping lens is located between the sample surface and the detector pixels.

7. The device of claim 6 wherein the mapping lens is a reducing lens.

8. The device of claim 6 wherein the mapping lens is a magnifying lens.

9. The device of claim 6 wherein the mapping lens comprises a light collimator.

10. The device of claim 6 wherein the mapping lens and the optical filter are combined into one apparatus.

11. The device of claim 6 wherein the chip further comprises the mapping lens.

12. The device of claim 11 wherein the bottom surface of the chip comprises a curved surface that functions as the mapping lens.

13. The device of claim 5 wherein the chip is in direct physical contact with the filter.

14. The device of claim 13 wherein the bottom surface of the chip is in contact with the filter.

15. The device of claim 14 wherein the filter and the detector array are in direct physical contact.

16. The device of claim 5 wherein the bottom surface of the chip is in direct physical contact with the filter.

17. The device of claim 4 wherein the nucleic acids are DNA.

18. The device of claim 4 wherein the chip is made of quartz.

19. The device of claim 4 wherein the chip is made of glass.

20. The device of claim 4 wherein the chip is made of light-transmissive plastic.

21. The device of claim 20 wherein the plastic is polystyrene.

22. The device of claim 4 comprising the chip, wherein the chip comprises an optical filter.

23. The device of claim 22 wherein the chip bottom surface is coated with an optical coating.

24. The device of claim 23 wherein the chip is in direct physical contact with the electronic light detector array.

25. The device of claim 4 wherein the detector array detector pixels are in direct physical contact with the optical filter.

26. The device of claim 25 wherein all of the detector array detector pixels are in direct physical contact with the optical filter.

27. A device for detecting the pattern of polynucleic acid hybridization to a surface, the device comprising:
   (a) a nucleic acid chip holder configured to receive a nucleic acid chip and keep the chip in a sampling position;
   the nucleic acid chip being an object with a flat sample surface and an opposed surface that is joined to the sample surface by a thickness, with the sample surface having sequences of nucleic acids immobilized thereto, with each sequence being immobilized to a particular chip address; and
   (b) an electronic light detector array, the detector array comprising detector pixels, the detector pixels being sensors located at particular detector pixel addresses;
   wherein the sampling position places the sample surface of the chip at a well-defined position relative to the electronic light detector array so that source light from a light source that touches a chip address on the sample surface is substantially directed onto at least one detector pixel with an address that is correlated to the chip address.

28. The device of claim 27 wherein the chip address to the detector pixel correlation is one-to-one.

29. The device of claim 27 wherein more than one detector pixel is correlated to one chip address.

30. The device of claim 27 wherein light leaving the sample surface of the chip passes through the chip thickness before reaching the detector pixels.

31. The device of claim 27 wherein the light leaving the sample surface of the chip passes through an optical filter.

32. The device of claim 31 wherein the optical filter allows substantially only light generated at the sample surface to pass to the detector.

33. The device of claim 32 wherein the optical filter substantially blocks the source light.

34. The device of claim 27 wherein the chip and the detector array are in direct physical contact.

35. The device of claim 34 wherein all wavelengths of light that touch the sample surface of the DNA chip are allowed to pass to the detector array.

36. The device of claim 35 wherein no optical filter is used in the light path between the sample surface and the detector array.

37. The device of claim 35 wherein all wavelengths of the source light are allowed to reach the detector pixels.

38. The device of claim 34 wherein the chip comprises an optical filter.

39. The device of claim 34 wherein the chip further comprises a mapping lens.

40. The device of claim 27 wherein the position of a dark spot on the sample surface, the dark spot being a spot that substantially blocks the passage of light, is mapped directly onto the detector array.

41. The device of claim 27 wherein the light source is used to illuminate the sample surface so that light leaving the sample surface is projected onto the detector array so that a dark spot on the sample surface, the dark spot being a spot on the sample surface that blocks more light than the surrounding surface, causes less light to be received by at least one detector pixel, whereby the address of the dark spot on the sample surface is detected.

42. A device for detecting the pattern of polynucleic acid hybridization to a surface, the device comprising:
   (a) a nucleic acid chip holder configured to receive a nucleic acid chip and keep the chip in a sampling position;
   the nucleic acid chip being an object with a flat sample surface and an opposed surface that is joined to the sample surface by a thickness, with the sample surface having sequences of nucleic acids immobilized thereto, with each sequence being immobilized to a particular chip address; and
   (b) an electronic light detector array, the detector array comprising detector pixels, the detector pixels being sensors located at particular detector pixel addresses;
   wherein the sampling position places the sample surface of the chip at a well-defined position relative to the electronic light detector array so that light leaving a chip address is substantially directed onto at least one detector pixel with an address that is correlated to the chip address.

43. The device of claim 42 wherein the chip address to the detector pixel correlation is one-to-one.

44. The device of claim 42 wherein more than one detector pixel is correlated to one chip address.

45. The device of claim 42 further including at least one optical lens, the optical lens being used to map an image of the sample surface onto the electronic light detector array.

46. The device of claim 45 wherein the number of all optical lenses used to map an image of the sample surface onto the electronic light detector array is one.

47. The device of claim 45 wherein the number of all optical lenses used to map an image of the sample surface onto the electronic light detector array is two.

48. The device of claim 42 wherein light leaving the sample surface of the chip is generated by chemiluminescence.

49. The device of claim 42 wherein light leaving the sample surface of the chip is generated by fluorescence.

50. The device of claim 42 wherein light leaving the sample surface of the chip is generated by two-photon excitation.

51. The device of claim 42 wherein light leaving the sample surface of the chip is generated by multi-photon excitation.

52. The device of claim 42 wherein the light leaving the sample surface is generated by fluorescence and polynucleic acids that attach to the sample surface cause a quenching of fluorescence.

53. The device of claim 52 wherein the light leaving the sample surface is generated by fluorescence and polynucleic acids that attach to the sample surface have attached molecules that cause a quenching of fluorescence.

54. The device of claim 42 wherein light leaving the sample surface of the chip is generated by a light source that generates source light.

55. The device of claim 54 wherein the source light is light that is detectable by the human eye.

56. The device of claim 42 wherein the light leaving the sample surface is generated by a light source that generates source light and polynucleic acides that attach to the sample surface have attached molecules that cause a decrease of the intensity of the light that leaves the sample surface.

57. The device of claim 42 wherein the light leaving the sample surface of the chip passes through an optical filter.

58. The device of claim 57 wherein the optical filter allows substantially only light generated at the sample surface to pass to the detector.

59. The device of claim 58 wherein the optical filter substantially blocks the light that is not generated at the sample surface.

60. The device of claim 42 wherein the chip and the detector array are in direct physical contact.

61. The device of claim 42 wherein light leaving the sample surface of the chip passes through the chip thickness before reaching the detector pixels.

62. The device of claim 42 wherein all wavelengths of light that touch the sample surface of the DNA chip are allowed to pass to the detector array.

63. The device of claim 62 wherein no optical filter is used in the light path between the sample surface and the detector array.

64. The device of claim 62 wherein all wavelengths of the source light are allowed to reach the detector pixels.

65. The device of claim 64 wherein the length of the light path is between 15 microns and 1 centimeter.

66. A system for imaging spots of polynucleic acid on a polynucleic acid chip, the system comprising:
   (a) light source means that emits source light;
   (b) light detector means, the light detector means including detector pixels;
   (c) holding means for holding the chip, the chip comprising a top sample surface and a bottom, the sample surface having addresses, the holding means being positioned relative to the light detector means so that light leaving a sample surface address is mapped onto at least one detector pixel;
   (d) electronic data processing means that processes electronic data from the chip;
   (e) data transmitting means that transmits data from the electronic light detector array
   (f) the system having a sample light path, which is the light path that must be to the electronic data processing means; and
   traveled by all of the light that leaves the sample surface and is detectable by the light detector means.

67. The system of claim 66 wherein the sample light path is less than 15 microns.

68. The system of claim 66 wherein every point of the sample light path has an index of refraction that is greater than 1.0.

69. The system of claim 68 wherein the sample light path is comprised of solid materials.

70. The system of claim 66 wherein the sample light path does not include an optical lens that magnifies the image of the sample surface.

71. The system of claim 66 wherein the sample light path does not include an optical lens that reduces the image of the sample surface.

72. The system of claim 66 wherein the sample light path is less than 1 centimeter.

73. The system of claim 66 wherein the sample light path is less than one millimeter.

74. The system of claim 66 wherein the sample light path is less than 200 microns.

75. The system of claim 66 wherein the sample light path is less than 75 microns.

76. The system of claim 66 wherein the sample light path is less than 35 microns.

77. A method for detecting spots of polynucleic acid on a polynucleic acid chip, the method comprising the following steps:
   (a) loading a polynucleic acid chip in a holder,
   (b) positioning the holder at a sampling position, the sampling position being a position relative to a light detector that establishes a sampling distance between the top sample surface of the chip and the light detector that allows light that emanates from a point approximately at the surface of the chip to travel along a short light path to the light detector, and
   (c) using a detection means to detect the signal generated by the light detector.

78. The method of claim 77 wherein the short light path is less than four millimeters.

79. The method of claim 77 wherein the short light path is less than 200 microns.

80. The method of claim 77 wherein the light path is substantially linear.

81. The method of claim 78 comprising the steps of using a positioning means to bring the holder from a loading position to the sampling position.

82. The method of claim 81 wherein the positioning means comprises a sliding mechanism.

83. The method of claim 82 wherein the positioning means comprises a motor.

84. The method of claim 83 wherein a chip is loaded into the holder while the holder is in a loading position and a switch is activated to turn the motor on to slide the holder to the sampling position.

85. The method of claim 77 further comprising focusing steps, the focusing steps comprising:
   (i) moving the holder to a new position,
   (ii) using the light detector, the detection means, and a graphic display means to visualize the surface of the sample; and
   (iii) repeating steps (i) and (ii) until a sampling distance desired by a user is achieved.

86. The method of claim 85 wherein the focusing steps are automatically performed by a programmable computer.

* * * * *

UNITED STATES PATENT AND TRADEMARK OFFICE
CERTIFICATE OF CORRECTION

| | |
|---|---|
| PATENT NO. | : 6,784,982 B1 |
| DATED | : August 31, 2004 |
| INVENTOR(S) | : Martin Blumefeld, PH.D., Joseph J. Talghader and Mark A. Sanders |

It is certified that error appears in the above-identified patent and that said Letters Patent is hereby corrected as shown below:

Title page,
Item [74], *Attorney, Agent, or Firm,* please delete "Fish & Richardson P.C.P.A" and insert -- Fish & Richardson, P.C., P.A. -- therefor;

Column 8,
Lines 50-51, please delete "to aching" and insert -- touching -- therefor.

Signed and Sealed this

Twenty-fourth Day of May, 2005

JON W. DUDAS
*Director of the United States Patent and Trademark Office*